(12) United States Patent
Yang et al.

(10) Patent No.: US 9,733,773 B2
(45) Date of Patent: Aug. 15, 2017

(54) TOUCH PANEL USING A DIELECTRIC LAYER TO ADJUST COLORS OF AN ACTIVE AREA AND A PERIPHERAL AREA

(71) Applicant: InnoLux Corporation, Miao-Li County (TW)

(72) Inventors: Cho-Hao Yang, Miao-Li County (TW); Bo-Yu Chen, Miao-Li County (TW); Jian-Hua Luo, Miao-Li County (TW); Jia-Hsin Li, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/679,147

(22) Filed: Apr. 6, 2015

(65) Prior Publication Data

US 2015/0301652 A1 Oct. 22, 2015

(30) Foreign Application Priority Data

Apr. 22, 2014 (TW) .............................. 103114482 A (51) Int. Cl.
*G06F 3/044* (2006.01)
*G06F 3/041* (2006.01)

(52) U.S. Cl.
CPC .............. *G06F 3/044* (2013.01); *G06F 3/041* (2013.01)

(58) Field of Classification Search
CPC .... G06F 1/1613; G06F 1/1633; G06F 1/1637; G06F 1/1641; G06F 1/1643; G06F 3/041; G06F 3/0412; G06F 3/044; G06F 2203/04103
See application file for complete search history.

(56) References Cited

U.S. PATENT DOCUMENTS

| 2006/0067633 | A1* | 3/2006 | Gally | G02B 26/001 385/129 |
| 2010/0259829 | A1* | 10/2010 | Kim | G02B 27/026 359/609 |
| 2013/0106746 | A1* | 5/2013 | Lai | G06F 3/041 345/173 |
| 2013/0194198 | A1* | 8/2013 | Guard | G06F 3/044 345/173 |

FOREIGN PATENT DOCUMENTS

CN 103092379 A 5/2013

OTHER PUBLICATIONS

CN Office Action dated Jun. 22, 2017 in Chinese application (No. 201410163599.0).

* cited by examiner

*Primary Examiner* — Nathan Danielsen
(74) *Attorney, Agent, or Firm* — McClure, Qualey & Rodack, LLP (57) ABSTRACT

A touch panel is provided. The touch panel includes a cover plate and a display element under the cover plate. A touch sensing layer is disposed at an active area of the touch panel and between the cover plate and the display element. A decorative layer is disposed at a peripheral area of the touch panel and between the cover plate and the display element, wherein the active area is surrounded by the peripheral area. The touch panel further includes a dielectric layer disposed between the cover plate and the display element, wherein the difference in reflectivity between the active area and the peripheral area is 0 to 0.5.

10 Claims, 6 Drawing Sheets

TOUCH PANEL USING A DIELECTRIC LAYER TO ADJUST COLORS OF AN ACTIVE AREA AND A PERIPHERAL AREA

CROSS REFERENCE TO RELATED APPLICATIONS

This Application claims priority of the Taiwan Patent Application No. 103114482, filed on Apr. 22, 2014, the entirety of which is incorporated by reference herein.

BACKGROUND OF THE INVENTION

Field of the Invention

The present invention relates to touch panel technology, and in particular to structural designs for adjusting the color of touch panels in appearance, and fabrication methods thereof.

Description of the Related Art

Along with developments in the electronics industry, various digital products, such as mobile phones, tablet computers, digital cameras and other electronic devices, have a requirement for touch functionality. Using touch panels on electronic products can provide faster and more convenient operation.

Touch panels can be roughly divided into resistive-type and capacitive-type touch technologies. Currently, the capacitive-type touch technology is a major technology for touch panels. In the capacitive type touch technology, a transparent conductive layer is patterned to form touch sensors. The transparent conductive layer is limited by the temperature of the deposition process thereof and the designs of integrated circuits for the touch sensors. Therefore, it requires a transparent conductive layer with a great thickness to satisfy the requirements of resistance for the touch sensors. However, the transparent electrode pattern of the touch sensors with a great thickness will case a visibility issue in the active area of the touch panel. As a result, the visual result in the active area of the touch panels is poor and the appearance of the touch panels is also affected. Therefore, currently, improvements upon the visual result of touch panels are made to focus on the active area with touch sensors formed therein.

BRIEF SUMMARY OF THE INVENTION

The disclosure provides structure designs of touch panels and fabrication methods thereof. The disclosure uses a dielectric layer to adjust colors of an active area and a peripheral area of touch panels in appearance by the principle of optical interference. After light enters the touch panels, reflected light spectrums from the active area and the peripheral area are similar. Thus, there is no difference in color between the visual result in the active area and the peripheral area of the touch panels in appearance. The visual result of the touch panels in appearance is thereby improved.

In some embodiments of the disclosure, a touch panel is provided. The touch panel comprises a cover plate and a display element disposed under the cover plate. A touch sensing layer is disposed at an active area of the touch panel, and between the cover plate and the display element. A decorative layer is disposed at a peripheral area of the touch panel, and between the cover plate and the display element, wherein the peripheral area surrounds the active area. The touch panel further comprises a dielectric layer disposed between the cover plate and the display element, wherein the difference in reflectivity between the active area and the peripheral area is 0 to 0.5.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Moreover, in the descriptions of the embodiments that follow, the orientations of "on", "over", "above", "under" and "below" are used for representing the relationship between the relative positions of each element in the touch panels, and not used to limit the present disclosure. In addition, a first element formed "on", "over", "above", "under" or "below" a second element includes embodiments having the first element in direct contact with the second element, or embodiments having additional elements inserted between the first element and the second element so that the first element is not in direct contact with the second element.

Figure 1:
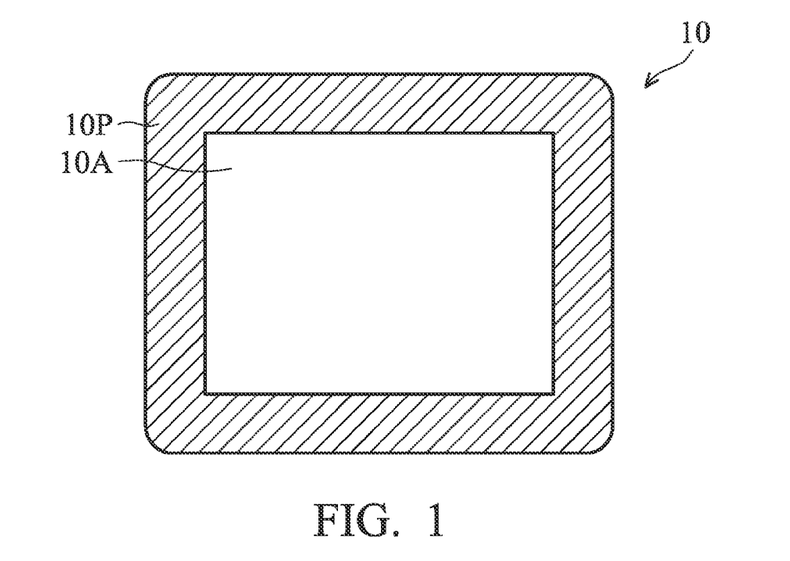
FIG. 1 shows a plane view of a touch panel without a dielectric layer of the disclosure.

As shown in FIG. 1, a touch panel 10 can be divided into an active area 10A and a peripheral area 10P surrounding the active area 10A. A touch sensing element is formed in the active area 10A. A decorative layer with light-shielding ability is formed in the peripheral area 10P. FIG. 1 shows a plane view of the touch panel 10 which does not have a dielectric layer of the disclosure. An electrically conductive material forming the touch sensing element is different from a light-shielding material forming the decorative layer. When the active area of the touch panel is in a state of not displaying images, a difference in color occurs between the visual result in the peripheral area 10P and the active area 10A of the touch panel 10 in appearance without a dielectric layer of the disclosure. For example, the peripheral area 10P appears black because of a black light-shielding material used therein and the active area 10A appears dark-blue because of the electrically conductive material used therein.

Figure 2:
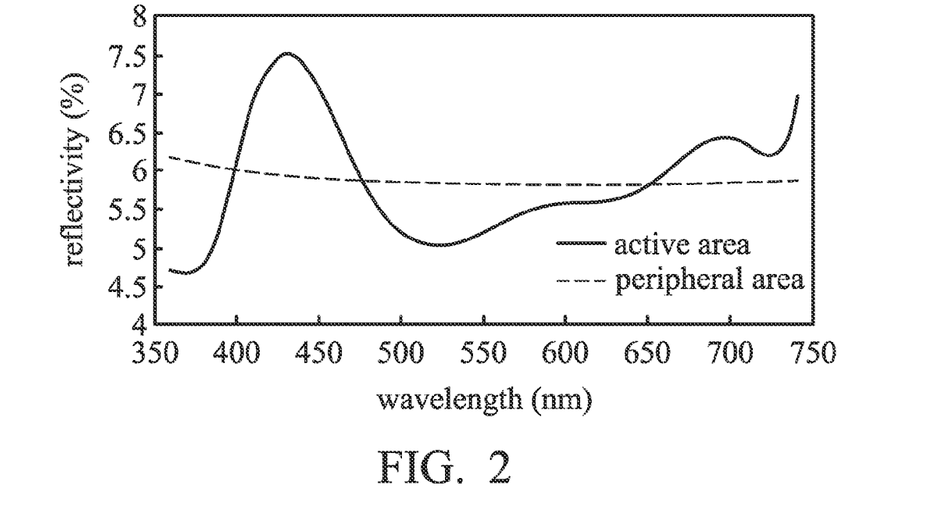
FIG. 2 shows a chart of reflected light spectrums from an active area and a peripheral area of the touch panel without a dielectric layer of the disclosure.

FIG. 2 shows a chart of reflected light spectrums from the active area 10A and the peripheral area 10P after light enters the active area 10A and the peripheral area 10P of the touch panel 10 without a dielectric layer of the disclosure. As shown in FIG. 2, the reflected light spectrums of the active area 10A and the peripheral area 10P of the touch panel 10 without a dielectric layer of the disclosure are not consistent with each other. In the visible light wavelength range of 350 nm to 750 nm, the difference in reflectivity between the peripheral area 10P and the active area 10A is about 1.5 at a maximum and is about 0.8 on average. It proves that visual results in the peripheral area 10P and the active area 10A of the touch panel 10 without a dielectric layer of the disclosure are different in color.

While an electrically conductive material layer for forming the touch sensing element is limited by the temperatures of deposition process and the designs of integrated circuits, it requires a great thickness to satisfy the resistance requirements for the electrically conductive material layer. However, the electrically conductive material layer with a great thickness will cause the difference in color between the peripheral area 10P and the active area 10A of the touch panel 10 to be more pronounced. Thus, the touch panel 10 without a dielectric layer of the disclosure has a poor visual result in appearance.

Figure 3:
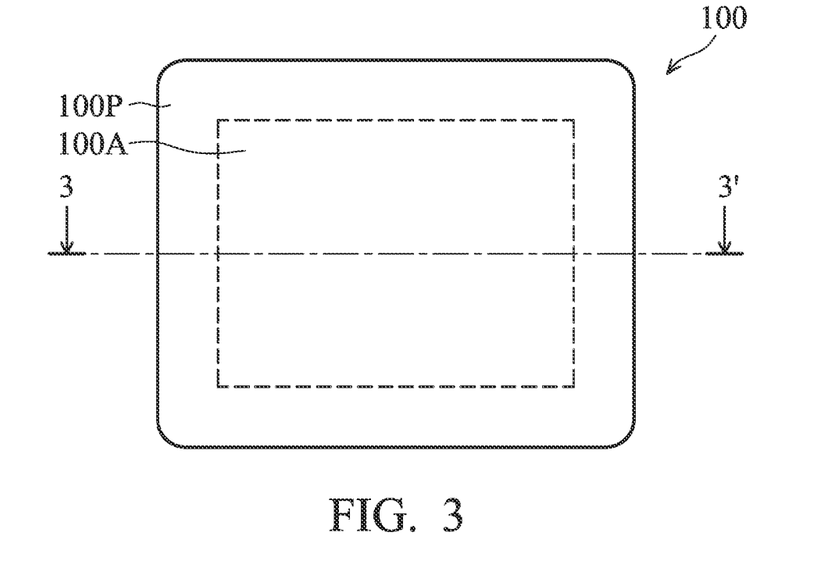
FIG. 3 shows an illustrative plane view of a touch panel according to some embodiments of the disclosure.

FIG. 3 shows a plane view of a touch panel 100 according to some embodiments of the disclosure, which has a dielectric layer to adjust the colors of a peripheral area 100P and an active area 100A thereof. According to some embodiments of the disclosure, using the dielectric layer can adjust the colors of a peripheral area 100P and an active area 100A of the touch panel 100 in appearance by the principle of optical interference. After light enters the touch panel 100, a reflected light spectrum from the active area 100A is similar to a reflected light spectrum from the peripheral area 100P.

Figure 4:
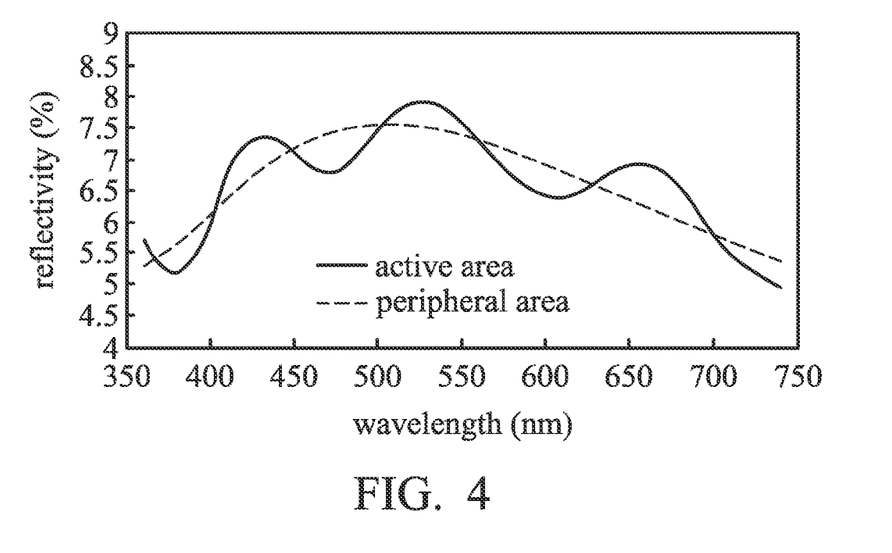
FIG. 4 shows a chart of reflected light spectrums from an active area and a peripheral area of the touch panel with a dielectric layer according to some embodiments of the disclosure.

As shown in FIG. 4, according to some embodiments of the disclosure, the reflected light spectrum from the active area 100A is similar to the reflected light spectrum from the peripheral area 100P of the touch panel 100, when the touch panel 100 has a dielectric layer to adjust colors of the peripheral area 100P and the active area 100A in appearance. In the visible light wavelength range of 350 nm to 750 nm, the difference in reflectivity ($\Delta R$) between the peripheral area 100P and the active area 100A is about 0.4 at a maximum and is about 0.3 on average.

Moreover, a colorimeter is used to measure chromaticity coordinates of peripheral area 100P and the active area 100A of the touch panel 100 of some embodiments of the disclosure. After the chromaticity coordinates are calculated, the chromatism ($\Delta E$) between the peripheral area 100P and the active area 100A is less than about 5. These prove that colors in the peripheral area 100P and the active area 100A of the touch panel 100 having the dielectric layer of the disclosure are similar to each other in appearance. Therefore, it is not easy for users to find a boundary line between the peripheral area 100P and the active area 100A. The visual result of the touch panels in appearance is improved. Furthermore, the appearance of electronic products containing the touch panels is also enhanced.

FIGS. 5-10 shows cross sections of touch panels 100 along a cross section line 3-3' of FIG. 3 according to some embodiments of the disclosure. In the embodiments of FIGS. 5-10, the touch panels 100 are illustrated with touch on display (TOD)-type touch panels which have touch sensors formed on a display element. However, the concepts of the disclosure can also be applied on the other types of touch panels, such as window integrated sensor (WIS)-type touch panels which have touch sensors formed on a cover plate, or GG-type touch panels which have touch sensors formed on a glass substrate between a cover plate and a display element.

Figure 5:
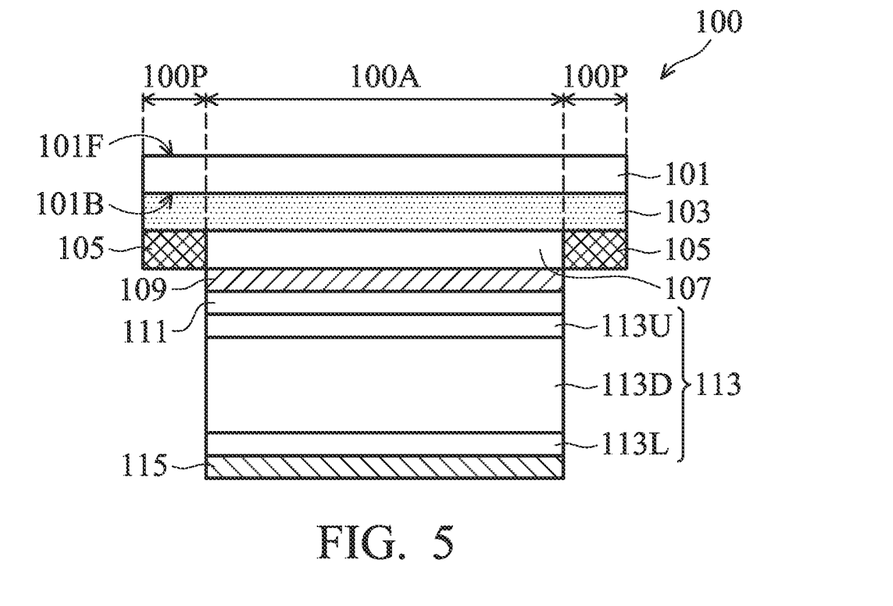
FIGS. 5-10 shows illustrative cross sections of touch panels along a cross section line 3-3' of FIG. 3 according to some embodiments of the disclosure.

As shown in FIG. 5, the touch panel 100 includes a cover plate 101. According to an embodiment of the disclosure, a dielectric layer 103 for adjusting colors in the peripheral area 100P and the active area 100A is formed on an inner surface 101B of the cover plate 101. An outer surface 101F of the cover plate 101 is used as a touch side of the touch panel 100. The cover plate 101 can be a glass substrate or a flexible plastic substrate. In the embodiment, the dielectric layer 103 is disposed in the peripheral area 100P and the active area 100A of the touch panel 100. After the dielectric layer 103 is formed, a decorative layer 105 is formed in the peripheral area 100P. From a view taking the cover plate 101 as a base and viewing from a direction under the cover plate 101, the decorative layer 105 is formed over the dielectric layer 103 in the peripheral area 100P. The material of the decorative layer 105 has a light-shielding effect, such as a black photoresist or printing inks having other colors. In some embodiments, the decorative layer 105 can be formed by a coating and photolithography process with a black photoresist. In some embodiments, the decorative layer 105 can be formed by a printing process with color printing ink.

The touch panel 100 further includes a display element 113 disposed under the cover plate 101. The display element 113 can be bonded to the cover plate 101 through an optical clear adhesive (OCA) 107. In some embodiments, the display element 113 is, for example, a liquid crystal display (LCD). In some other embodiments, the display element 113 can be another type of display panel, such as an organic light-emitting diode (OLED) display panel.

In the embodiment, a touch sensing layer 111 of the touch panel 100 is formed on an outer surface of an upper substrate 113U of the display element 113, wherein the outer surface of the upper substrate 113U faces the cover plate 101. In an embodiment, the display element 113 is, for example, an LCD, the upper substrate 113U of the display element 113 is a color filter substrate, and a lower substrate 113L of the display element 113 is a thin-film transistor array substrate. A display medium layer 113D sandwiched between the upper substrate 113U and the lower substrate 113L is a liquid crystal layer. Moreover, an upper polarizer 109 used for a LCD is disposed above the touch sensing layer 111. A lower polarizer 115 is disposed under the lower substrate 113L of the display element 113.

In some embodiments, a touch sensing element of the touch sensing layer 111 is, for example, a capacitance type touch sensing element which includes one layer or two layers of an electrode pattern with an X-axial direction and a Y-axial direction. The electrode pattern can be formed by deposition, photolithography and etching processes using a transparent conductive material. The transparent conductive material is, for example, indium tin oxide (ITO) or indium zinc oxide (IZO).

According to some embodiments of the disclosure, the materials of the dielectric layer 103 can be inorganic materials with a refractive index of about 1.4 to 2.4, for example, $Nb_2O_5$, $SiO_2$, $Al_2O_3$, SiOxNy or a combination thereof. Furthermore, the materials of the dielectric layer 103 can be organic materials with a refractive index of about 1.4 to 2.4, such as a polymer containing high refractive index particles. The polymer is, for example, phenolic resins or acrylic resins. According to some embodiments of the disclosure, the dielectric layer 103 has a thickness in a range of about 10 nm to 5 μm. The dielectric layer 103 can be a single-layered or a multi-layered structure. The dielectric layer 103 can be formed of the above-described inorganic materials, organic materials or a combination thereof. The dielectric layer 103 can be formed by a coating process, a deposition process or a combination thereof.

According to some embodiments of the disclosure, the refractive index and the thickness of the dielectric layer 103 can be adjusted. After light enters the touch panel 100, the reflected light spectrum from the active area 100A is similar to the reflected light spectrum from the peripheral area 100P of the touch panel 100 by the principle of optical interference and the above adjustments in the dielectric layer 103. As a result, a difference in reflectivity (ΔR) between the peripheral area 100P and the active area 100A is about 0 to about 0.5. Therefore, colors in the active area 100A and the peripheral area 100P of the touch panel 100 are similar to each other in appearance. Thus, it is not easy for users to find a boundary line between the active area 100A and the peripheral area 100P. The visual result of the touch panels in appearance is improved. Moreover, the dielectric layer 103 can be used to adjust colors in the active area 100A and the peripheral area 100P according to the requirements for colors of the touch panels in appearance. This gives the touch panels of various colors an enhanced appearance.

Some embodiments of the disclosure are listed below, which are illustrated with the structure of the touch panel 100 of FIG. 5. The dielectric layer 103 having various refractive indexes, thicknesses and materials is used to adjust colors in the active area 100A and the peripheral area 100P of the touch panel 100 in appearance. The active area 100A and the peripheral area 100P of the touch panel 100 of the embodiments are measured to obtain the reflectivity (R) and chromaticity coordinates L, a*, b* thereof. Moreover, the difference in reflectivity (ΔR) and the chromatism (ΔE) between the active area 100A and the peripheral area 100P are also obtained by calculation. The difference in reflectivity (ΔR) and the chromatism (ΔE) between an active area and a peripheral area of a touch panel without the dielectric layer of the disclosure are also listed below.

layers having a refractive index of about 1.4 to about 2.4, a thickness of about 200 Å to about 2300 Å, and a single-layered or a multi-layered structure are used to adjust colors in the active area and the peripheral area of the touch panels in appearance. This can obtain a difference in reflectivity (ΔR) and a value of chromatism (ΔE) between the active area and the peripheral area of the touch panels of less than 0.04 and less than 4, respectively. The difference in reflectivity (ΔR) and the chromatism (ΔE) between the active area and the peripheral area of the touch panels of the examples of the disclosure are much less than that of the comparative example. It proves that design of the dielectric layer of the disclosure can make the color in the active area similar to the color in the peripheral area of the touch panels in appearance. Therefore, the appearance of the touch panels is enhanced.

In some embodiments as described below, the design of the dielectric layer is used to adjust a reflected light spectrum from the active area of the touch panel and make it similar to a reflected light spectrum from the peripheral area of the touch panel. In some other embodiments as described below, the design of the dielectric layer is used to adjust both reflected light spectrums from the active area and the peripheral area of the touch panel and make these two reflected light spectrums similar to each other. In some other embodiments as described below, design of the dielectric layer is used to adjust a reflected light spectrum from the peripheral area of the touch panel and make it similar to a reflected light spectrum from the active area of the touch panel. These methods can make a difference in reflectivity (ΔR) between the active area and the peripheral area in a range of about 0 to 0.5. Furthermore, these methods can make a value of chromatism (ΔE) between the active area and the peripheral area in a range of about 0 to 5. Therefore, the color in the active area is similar to the color in the peripheral area in appearance. The visual result of the touch panels in appearance is thereby enhanced.

Figure 6:
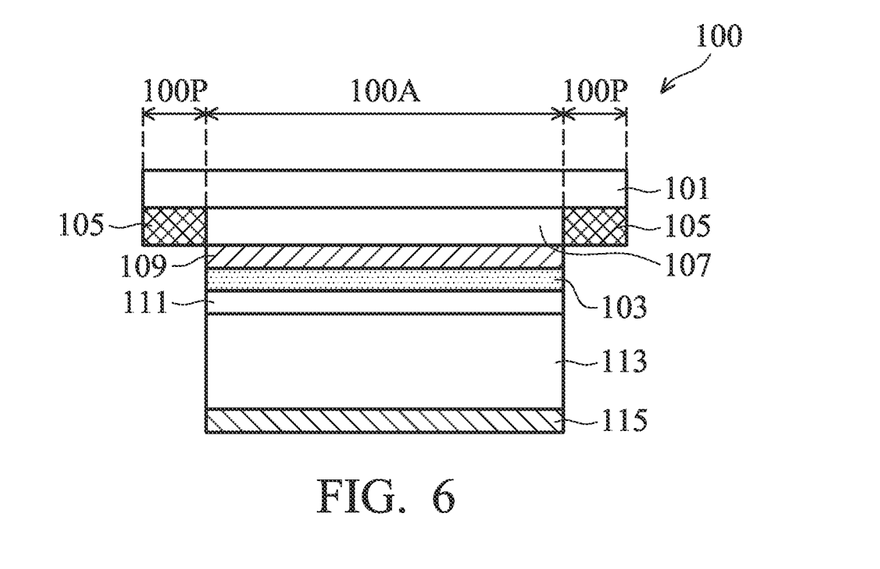

Referring to FIG. 6, a cross section of a touch panel 100, along a cross section line 3-3' of FIG. 3, according to an embodiment of the disclosure is shown. The difference between FIG. 6 and FIG. 5 is that the dielectric layer 103 of the touch panel 100 of FIG. 6 is only disposed in the active

TABLE 1

The difference in reflectivity (ΔR) and the chromatism (ΔE) between the active area and the peripheral area of the touch panels of a comparative example and various examples

| conditions of dielectric layer | | | comparative example | example 1 | example 2 | example 3 |
|---|---|---|---|---|---|---|
| material | | | — | Nb2O5 | SiOxNy | Nb2O5 + SiO2 |
| refractive index | | | — | 2.323 | 1.775 | 2.232/1.473 |
| thickness (Å) | | | — | 210 | 2300 | 800/530 |
| peripheral area | reflectivity | R | 5.8 | 9.9 | 7.2 | 6.0 |
| | chromaticity coordinates | L | 29.01 | 37.7421 | 32.3417 | 29.5073 |
| | | a* | 0.07 | −0.8314 | −2.4956 | 0.7969 |
| | | b* | −0.35 | −10.4221 | 0.2588 | −6.0302 |
| active area | reflectivity | R | 5.22 | 9.9 | 7.2 | 6.0 |
| | chromaticity coordinates | L | 27.75 | 37.75 | 32.24 | 29.53 |
| | | a* | 4.65 | 3.02 | −0.10 | 4.45 |
| | | b* | −5.75 | −11.73 | −2.45 | −7.77 |
| difference in reflectivity (ΔR) | | | −0.62 | 0.01 | −0.04 | 0.01 |
| chromatism (ΔE) | | | 7.2 | 4.1 | 3.6 | 4.0 |

As seen in Table 1, the difference in reflectivity (ΔR) and the chromatism (ΔE) between the active area and the peripheral area of the touch panel without the dielectric layer of the disclosure are −0.62 and 7.2, respectively. However, according to the embodiments of the disclosure, the dielectric area 100A of the touch panel 100. The dielectric layer 103 of FIG. 6 is disposed between the touch sensing layer 111 and the upper polarizer 109. In the embodiment of FIG. 6, after the touch sensing layer 111 is formed on the outer surface of the upper substrate of the display element 113, wherein the outer surface faces the cover plate 101, the dielectric layer 103 is formed on the touch sensing layer 111. The materials, refractive indexes, and thicknesses of the dielectric layer 103 can be the same as in the above description, and these are not repeated herein. In the embodiment, the dielectric layer 103 is used to adjust a reflected light spectrum from the active area 100A. As a result, the reflected light spectrum from the active area 100A is similar to the reflected light spectrum from the peripheral area 100P. Thus, the color in the active area 100A is similar to the color in the peripheral area 100P in appearance. The visual result of the touch panel in appearance is thereby enhanced.

Figure 7:
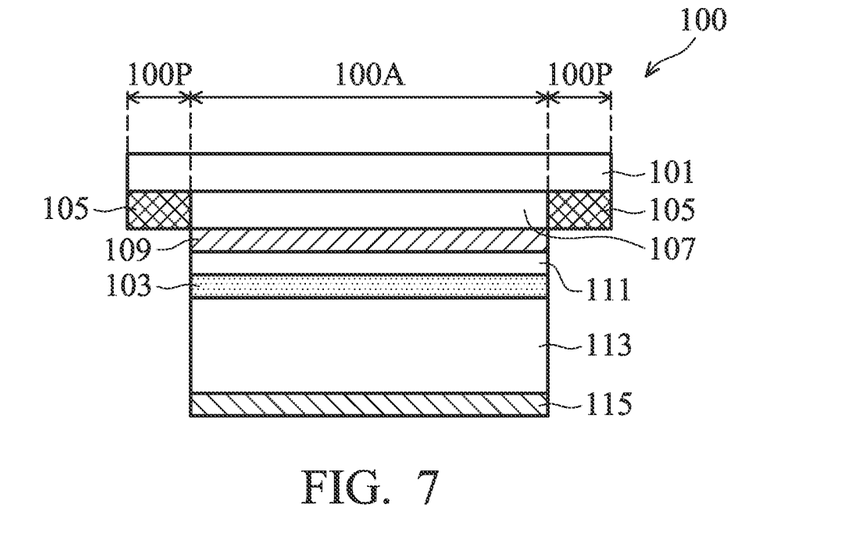

FIG. 7 shows a cross section of a touch panel 100, along a cross section line 3-3' of FIG. 3, according to an embodiment of the disclosure. The difference between FIG. 7 and FIG. 6 is that the dielectric layer 103 of the touch panel 100 of FIG. 7 is disposed between the display element 113 and the touch sensing layer 111. In the embodiment, firstly, the dielectric layer 103 is formed on the outer surface of the upper substrate of the display element 113, wherein the outer surface faces the cover plate 101. Next, the touch sensing layer 111 is formed on the dielectric layer 103. The materials, refractive indexes, and thicknesses of the dielectric layer 103 can be the same as the above description. The dielectric layer 103 of the touch panel 100 of FIG. 7 is only disposed in the active area 100A. The dielectric layer 103 is used to adjust a reflected light spectrum from the active area 100A. As a result, the reflected light spectrum from the active area 100A is similar to the reflected light spectrum from the peripheral area 100P. Thus, the color in the active area 100A is similar to the color in the peripheral area 100P in appearance. The visual result of the touch panel is thereby enhanced in appearance.

Figure 8:
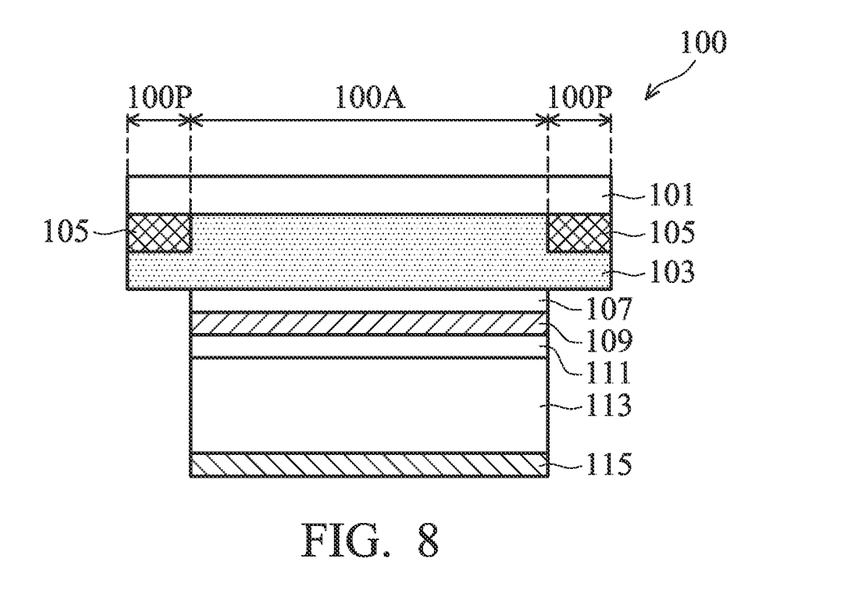

FIG. 8 shows a cross section of a touch panel 100, along a cross section line 3-3' of FIG. 3, according to an embodiment of the disclosure. In the embodiment, viewing from a direction of placing the cover plate 101 below, after the decorative layer 105 is formed on the inner surface of the cover plate 101 and disposed in the peripheral area 100P of the touch panel, the dielectric layer 103 is formed on the inner surface of the cover plate 101. The dielectric layer 103 is disposed in the active area 100A and the peripheral area 100P. The portion of the dielectric layer 103 in the active area 100A is directly formed on the inner surface of the cover plate 101. The portion of the dielectric layer 103 in the peripheral area 100P covers the decorative layer 105. The materials, refractive indexes, and thicknesses of the dielectric layer 103 can be the same as the above description. In the embodiment, the dielectric layer 103 is used to adjust a reflected light spectrum from the active area 100A. As a result, the reflected light spectrum from the active area 100A is similar to the reflected light spectrum from the peripheral area 100P. Thus, the colors in the active area 100A and the peripheral area 100P are similar to each other in appearance. The visual result of the touch panel is thereby enhanced in appearance.

In the embodiment, the touch sensing layer 111 is formed on the outer surface of the upper substrate of the display element 113, wherein the outer surface faces the cover plate 101. The touch sensing layer 111 is disposed between the upper polarizer 109 and the display element 113. The upper polarizer 109 is bonded to the dielectric layer 103 through the OCA 107 to complete the structure of the touch panel 100 of FIG. 8.

Figure 9:
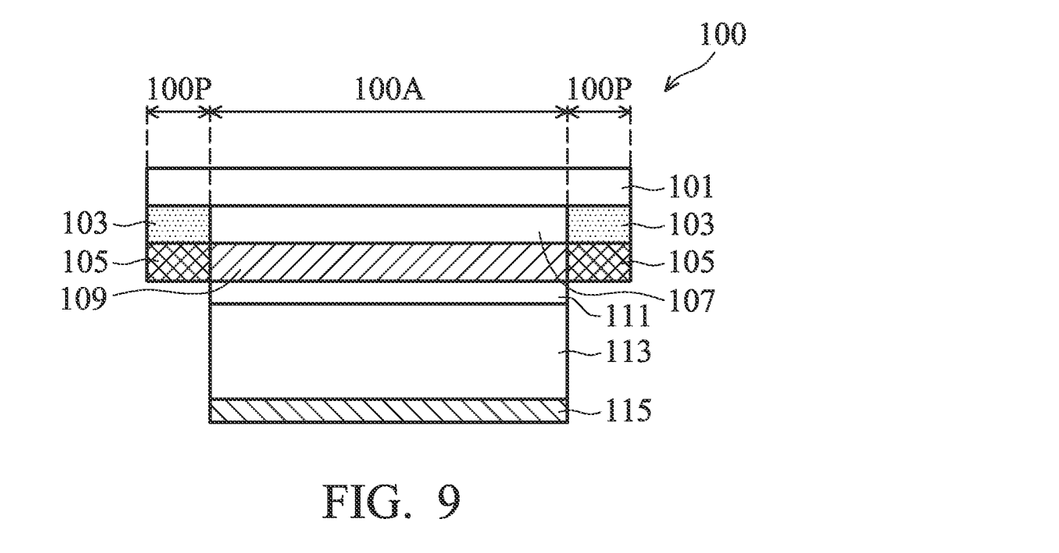

FIG. 9 shows a cross section of a touch panel 100, along a cross section line 3-3' of FIG. 3, according to an embodiment of the disclosure. In the embodiment, the dielectric layer 103 is only disposed in the peripheral area 100P of the touch panel 100. The materials, refractive indexes, and thicknesses of the dielectric layer 103 can be the same as the above description. In the embodiment, firstly, the dielectric layer 103 is formed on the inner surface of the cover plate 101 in the peripheral area 100P. Then, viewing from a direction of placing the cover plate 101 below, the decorative layer 105 is formed above the dielectric layer 103. In the embodiment, the dielectric layer 103 is used to adjust a reflected light spectrum from the peripheral area 100P. As a result, the reflected light spectrum from the peripheral area 100P is similar to the reflected light spectrum from the active area 100A. Thus, the color in the peripheral area 100P is similar to the color in the active area 100A in appearance. The visual result of the touch panel is thereby enhanced in appearance.

In the embodiment, the touch sensing layer 111 is formed on the outer surface of the upper substrate of the display element 113, wherein the outer surface faces the cover plate 101. The touch sensing layer 111 is disposed between the upper polarizer 109 and the display element 113. The upper polarizer 109 is bonded to the cover plate 101 through the OCA 107 to complete the structure of the touch panel 100 of FIG. 9.

Figure 10:
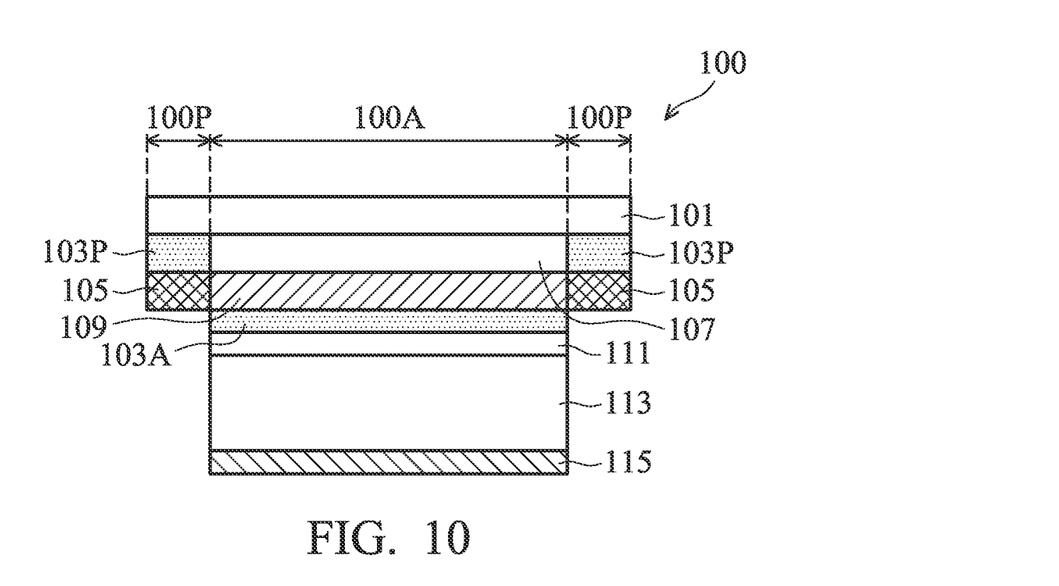

FIG. 10 shows a cross section of a touch panel 100, along a cross section line 3-3' of FIG. 3, according to an embodiment of the disclosure. The difference between FIG. 10 and FIG. 9 is that, in addition to a dielectric layer 103P in the peripheral area 100P, the touch panel 100 of FIG. 10 further includes a dielectric layer 103A disposed in the active area 100A. The materials, refractive indexes, and thicknesses of the dielectric layers 103P and 103A can be the same as the above description.

In the embodiment, the dielectric layer 103A in the active area 100A is disposed between the touch sensing layer 111 and the upper polarizer 109. The dielectric layer 103P in the peripheral area 100P is disposed between the cover plate 101 and the decorative layer 105. In the embodiment, the touch sensing layer 111 is formed on the outer surface of the upper substrate of the display element 113, wherein the outer surface faces the cover plate 101. Next, the dielectric layer 103A is formed on the touch sensing layer 111. Then, the upper polarizer 109 is bonded onto the dielectric layer 103A.

In another embodiment, the dielectric layer 103A in the active area 100A can be disposed between the touch sensing layer 111 and the display element 113. In the embodiment, firstly, the dielectric layer 103A is formed on the outer surface of the upper substrate of the display element 113, wherein the outer surface faces the cover plate 101. Next, the touch sensing layer 111 is formed on the dielectric layer 103A and then the upper polarizer 109 is bonded thereto.

In these embodiments, the dielectric layer 103P is used to adjust a reflected light spectrum from the peripheral area 100P. Moreover, the dielectric layer 103A is used to adjust a reflected light spectrum from the active area 100A. As a result, the reflected light spectrums from the peripheral area 100P and the active area 100A are similar to each other. Thus, the colors in the peripheral area 100P and the active area 100A are similar to each other in appearance. The visual result of the touch panel in appearance is thereby enhanced.

Figure 11:
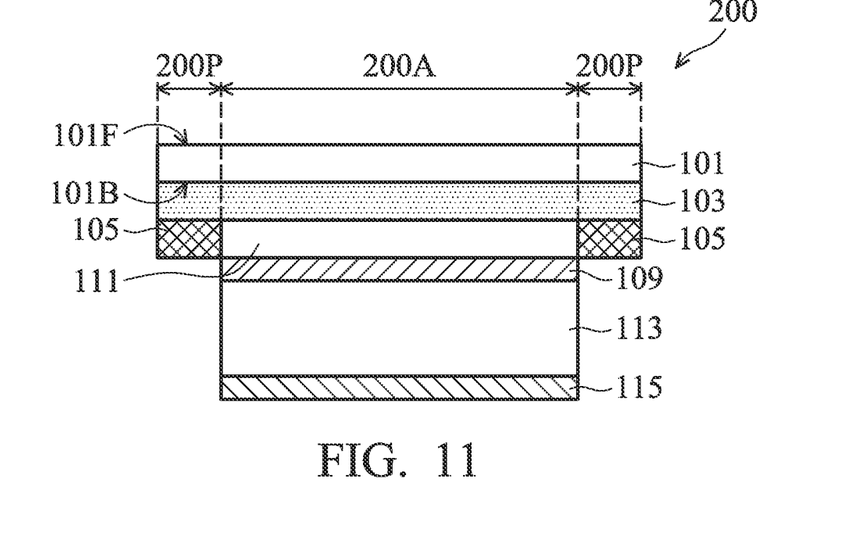
FIGS. 11-12 show illustrative cross sections of touch panels according to some other embodiments of the disclosure.

FIG. 11 shows a cross section of a touch panel 200 according to some embodiments of the disclosure. The touch panel 200 of FIG. 11 is a window integrated sensor (WIS) type touch panel which has a touch sensing element formed on a cover plate. In the embodiments, a dielectric layer 103 for adjusting the colors at a peripheral area 200P and an active area 200A of the touch panel 200 is formed on an inner surface 101B of a cover plate 101. The materials, refractive indexes, and thicknesses of the dielectric layer 103 can be the same as the above description. In some embodiments, the dielectric layer 103 is disposed both in the peripheral area 200P and the active area 200A. In some other embodiments, the dielectric layer 103 is only disposed in the active area 200A or the peripheral area 200P.

In the embodiments of FIG. 11, viewing from a direction of placing the cover plate 101 below, a decorative layer 105 is formed over the dielectric layer 103 and disposed in the peripheral area 200P. A touch sensing layer 111 is also formed over the dielectric layer 103 and disposed in the active area 200A, such that the touch sensing element is integrated onto the cover plate 101. In the embodiments, a display element 113 can be an LCD, for example. An upper polarizer 109 and a lower polarizer 115 are respectively disposed on the upper and lower surfaces of the display element 113. The upper polarizer 109 can be bonded to the touch sensing layer 111 formed on the cover plate 101 through an OCA (not shown) to complete the touch panel 200 of FIG. 11.

In the embodiments, the dielectric layer 103 can adjust reflected light spectrums both from the active area 200A and the peripheral area 200P. As a result, the reflected light spectrums from the active area 200A and the peripheral area 200P are similar to each other. Thus, the colors in the active area 200A and the peripheral area 200P are similar in appearance. The visual result of the touch panels in appearance is thereby enhanced.

In other embodiments, the dielectric layer 103 can be disposed by the other methods as per the above description. For example, the dielectric layer 103 is only disposed in the active area 200A or the peripheral area 200P to make a reflected light spectrum from the active area 200A or the peripheral area 200P similar to a reflected light spectrum from another area. Thus, the colors in the active area 200A and the peripheral area 200P are similar to each other in appearance. The visual result of the touch panel is thereby enhanced in appearance.

Figure 12:
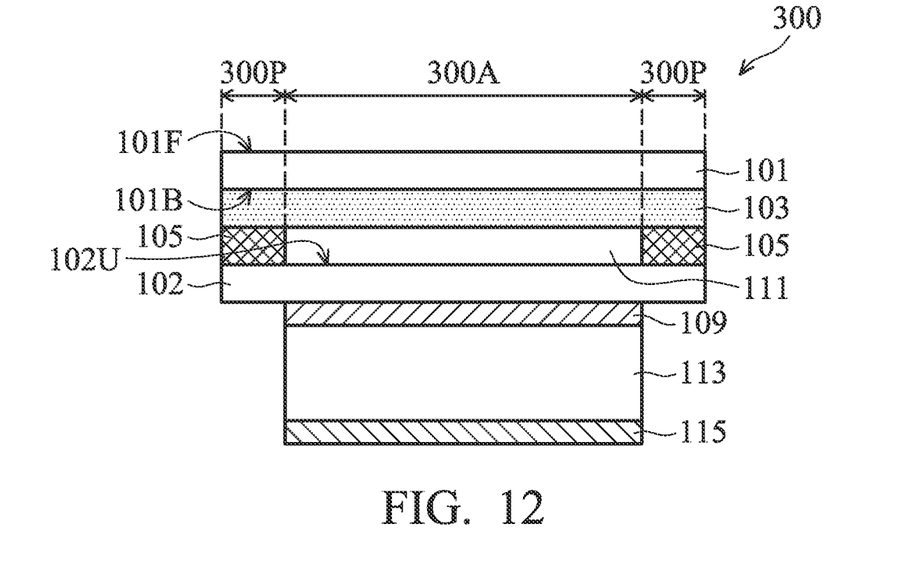

FIG. 12 shows a cross section of a touch panel 300 according to some embodiments of the disclosure. The touch panel 300 of FIG. 12 is a GG type touch panel which has a touch sensing element formed on a glass substrate 102 between a cover plate 101 and a display element 113. In the embodiments, a dielectric layer 103 for adjusting colors at a peripheral area 300P and an active area 300A of the touch panel 300 is formed on an inner surface 101B of the cover plate 101. The materials, refractive indexes, and thicknesses of the dielectric layer 103 can be the same as the above description. In some embodiments, the dielectric layer 103 is disposed both in the peripheral area 300P and the active area 300A. In some other embodiments, the dielectric layer 103 is only disposed in the active area 300A or the peripheral area 300P.

In the embodiments of FIG. 12, the touch panel 300 further includes an additional glass substrate 102 disposed between the cover plate 101 and the display element 113. A touch sensing layer 111 is formed on a surface 102U of the glass substrate 102, wherein the surface 102U faces the cover plate 101. In some embodiments, a decorative layer 105 is formed on the surface 102U of the glass substrate 102 and disposed in the peripheral area 300P. In some other embodiments, viewing from a direction of placing the cover plate 101 below, a decorative layer 105 is formed on the dielectric layer 103 and disposed in the peripheral area 300P.

In the embodiments, the touch sensing layer 111 can be bonded to the dielectric layer 103 through an OCA (not shown). The display element 113 is, for example, an LCD. An upper polarizer 109 and a lower polarizer 115 are respectively disposed on the upper and lower surfaces of the display element 113. The upper polarizer 109 can be bonded to the glass substrate 102 through an OCA (not shown) to complete the touch panel 300 of FIG. 12.

In the embodiments, the dielectric layer 103 can adjust reflected light spectrums both from the active area 300A and the peripheral area 300P. As a result, the reflected light spectrums from the active area 300A and the peripheral area 300P are similar to each other. Thus, the colors in the active area 300A and the peripheral area 300P are similar in appearance. The visual result of the touch panels in appearance is thereby enhanced.

In other embodiments, the dielectric layer 103 can be disposed by the other methods as above description. For example, the dielectric layer 103 is only disposed in the active area 300A or the peripheral area 300P to make a reflected light spectrum from the active area 300A or the peripheral area 300P similar to a reflected light spectrum from another area. Thus, the colors in the active area 300A and the peripheral area 300P are similar to each other in appearance. The visual result of the touch panel is thereby enhanced in appearance.

According to the embodiments of the disclosure, the dielectric layer is used to adjust reflected light spectrums from the active area and the peripheral area of the touch panels by the principle of optical interference and make the reflected light spectrums from the active area and the peripheral area similar to each other. The reflected light spectrums from the active area and the peripheral area can be similar to each other by selecting the material of the dielectric layer and adjusting the refractive index and the thickness of the dielectric layer. As a result, the colors in the active area and the peripheral area of the touch panels are similar to each other in appearance. Therefore, the visual result of the touch panels in appearance is improved. The appearance of the touch panels is thereby enhanced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
   a cover plate;
   a display element disposed under the cover plate;
   a touch sensing layer disposed at an active area of the touch panel and between the cover plate and the display element;
   a decorative layer disposed at a peripheral area of the touch panel and between the cover plate and the display element, wherein the peripheral area surrounds the active area; and
   a dielectric layer disposed between the cover plate and the display element, such that the difference in reflectivity between the active area and the peripheral area is 0 to 0.5%.

2. The touch panel of claim 1, wherein a value of chromatism between the active area and the peripheral area is 0 to 5.

3. The touch panel of claim 1, wherein the dielectric layer is disposed between the touch sensing layer and the display element.

4. The touch panel of claim 1, wherein the dielectric layer is disposed between the cover plate and the touch sensing layer.

5. The touch panel of claim 4, wherein the dielectric layer is disposed in the peripheral area of the touch panel.

6. The touch panel of claim 5, wherein the dielectric layer is further disposed in the active area of the touch panel.

7. The touch panel of claim 6, wherein the dielectric layer is formed on an inner surface of the cover plate, and the dielectric layer in the peripheral area is disposed between the cover plate and the decorative layer.

8. The touch panel of claim 6, wherein the dielectric layer in the active area is formed on an inner surface of the cover plate, and the decorative layer is disposed between the cover plate and the dielectric layer in the peripheral area.

9. The touch panel of claim 1, wherein the touch sensing layer is formed over a surface of an upper substrate of the display element, and the surface faces the cover plate.

10. The touch panel of claim 1, wherein the material of the dielectric layer is selected from a group consisting of inorganic materials and organic materials having a refractive index of 1.4 to 2.4, and the dielectric layer comprises a single-layered or a multi-layered structure.

* * * * *